United States Patent
Lewis et al.

(10) Patent No.: US 10,795,741 B2
(45) Date of Patent: Oct. 6, 2020

(54) GENERATING DEEPLINKS FOR APPLICATIONS BASED ON MULTI-LEVEL REFERRER DATA

(71) Applicant: Google LLC, Mountain View, CA (US)

(72) Inventors: Justin Lewis, Mountain View, CA (US); Scott Davies, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/346,471

(22) PCT Filed: Feb. 15, 2017

(86) PCT No.: PCT/US2017/017970
§ 371 (c)(1),
(2) Date: Apr. 30, 2019

(87) PCT Pub. No.: WO2018/151722
PCT Pub. Date: Aug. 23, 2018

(65) Prior Publication Data
US 2019/0278641 A1    Sep. 12, 2019

(51) Int. Cl.
*G06F 3/00* (2006.01)
*G06F 9/44* (2018.01)
(Continued)

(52) U.S. Cl.
CPC ............ *G06F 9/547* (2013.01); *G06F 16/955* (2019.01); *G06F 16/9566* (2019.01); *G06F 16/972* (2019.01)

(58) Field of Classification Search
CPC ........................................................ G06F 9/547
(Continued)

(56) References Cited

U.S. PATENT DOCUMENTS 9,195,477 B1    11/2015 Spencer
9,436,765 B2    9/2016 Abrahami et al.
(Continued)

FOREIGN PATENT DOCUMENTS

WO    WO 2007/096603    8/2007

OTHER PUBLICATIONS

PCT Preliminary Report for International Application No. PCT/US2017/017970 dated Aug. 29, 2019, 8 pages.
(Continued)

*Primary Examiner* — Timothy A Mudrick
(74) *Attorney, Agent, or Firm* — Foley & Lardner LLP

(57) ABSTRACT

Systems and methods for providing referrer data to an application are provided. One method includes receiving a first set of data packets indicating a command to navigate from a first resource to a second resource. The first set of data packets identifies the first resource and secondary referrer data associated with the first resource or a first content item on the first resource. The method includes rendering the second resource and a second content item provided within the second resource. The method includes receiving a selection of the second content item. The method includes generating a second set of data packets including the secondary referrer data and primary referrer data associated with the second resource or the second content item. The method includes transmitting the second set of data packets to a server, receiving a deeplink generated by the server, and rendering a content interface using the deeplink.

20 Claims, 5 Drawing Sheets

(51) Int. Cl.
*G06F 9/46* (2006.01)
*G06F 13/00* (2006.01)
*G06F 9/54* (2006.01)
*G06F 16/955* (2019.01)
*G06F 16/958* (2019.01)

(58) Field of Classification Search
USPC .......................................................... 719/311
See application file for complete search history.

(56) References Cited

U.S. PATENT DOCUMENTS

| | | |
|---|---|---|
| 2011/0239103 A1 | 9/2011 | Mercuri |
| 2015/0156061 A1 | 6/2015 | Saxena et al. |
| 2015/0199442 A1 | 7/2015 | Hahn et al. |
| 2016/0292728 A1 | 10/2016 | Kang et al. |

OTHER PUBLICATIONS

Written Opinion of the International Searching Authority re PCT/US2017017970 dated Jun. 14, 2017.
International Search Report re PCT/US2017017970 dated Jun. 14, 2017.

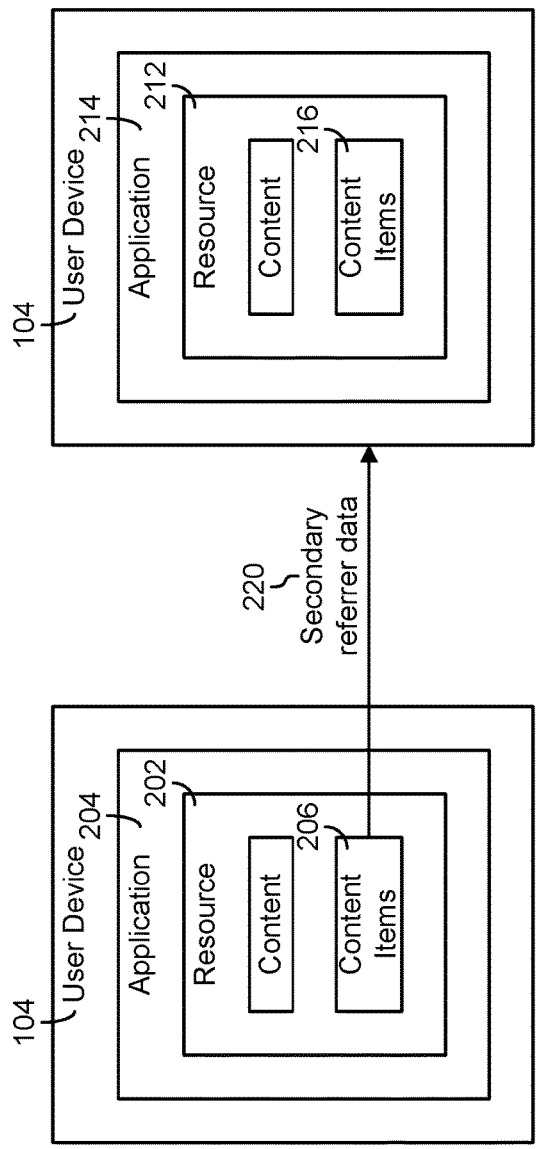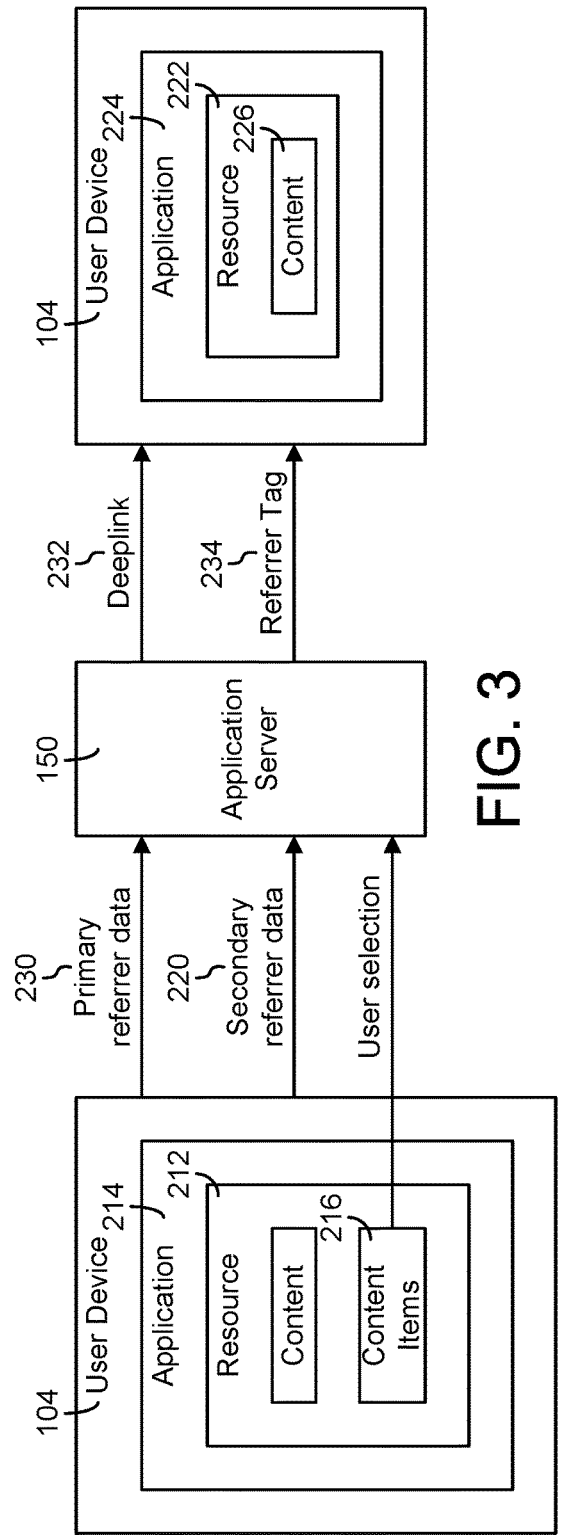

GENERATING DEEPLINKS FOR APPLICATIONS BASED ON MULTI-LEVEL REFERRER DATA

CROSS-REFERENCE TO RELATED APPLICATIONS

This application is a National Stage Application under 35 U.S.C. § 371 of International Patent Application No. PCT/US2017/017970, filed Feb. 2, 2017, entitled "Generating Deeplinks for Applications Based on Multi-Level Refer Data," the entirety of which is incorporated by reference herein.

BACKGROUND

In a networked environment, such as the Internet, first-party content providers can provide information to user devices for presentation on resources, such as webpages, mobile applications, documents, other applications, and/or other resources. Additional third-party content can also be provided by third-party content providers for presentation on the user devices together with the information from the first-party content providers. A publisher may provide first-party content and third-party content on his or her resource.

In some implementations, the selection of content on a resource may cause an application to open on the user device. For example, selection of content may cause the opening of an application that includes additional content related to the selected content. One challenge is providing content within the application that is contextually relevant to the user.

SUMMARY

One illustrative implementation of the disclosure relates to a method. The method includes receiving, at a computing device, a selection of a first content item on a first resource. The method further includes generating, at the computing device, a set of one or more data packets. The data packets include primary referrer data associated with at least one of the first content item and the first resource and secondary referrer data associated with at least one of a second resource previously viewed by a user on the first application or a second application, and a second content item displayed on the second resource. The method further includes transmitting, at the computing device, the set of data packets to a server. The method further includes receiving, from the server at the computing device, a deeplink generated by the server using both the primary referrer data and the secondary referrer data. The method further includes rendering, at the computing device, within an application indicated by the deeplink, a content interface having content generated in accordance with the deeplink.

The set of one or more data packets generated at the computing device may be a second set of one or more data packets. The method may include receiving, via the first application of the computing device, a first set of one or more data packets indicating a command to navigate from the second resource to the first resource. The first set of data packets may identify the first resource and the secondary referrer data associated with at least one of the second resource or the second content item selected on the second resource to generate the first set of data packets. The method may further include rendering, within the first application of the computing device, the first resource and the first content item provided within the first resource. The secondary referrer data of the second set of one or more data packets may be extracted from the first set of one or more data packets. The first and second applications may be the same application or may be different applications.

In some implementations, the deeplink includes a uniform resource locator (URL) or uniform resource identifier (URI) partially including a referrer field including parameters relating to the primary referrer data and the secondary referrer data. The parameters may be one of common gateway interface (CGI) parameters and parameters generated from a key-value pair map.

In some implementations, rendering a content interface on the application indicated by the deeplink includes downloading the application indicated by the deeplink from the server. The deeplink may include a referrer tag including parameters representative of the primary referrer data and the secondary referrer data.

In some implementations, the secondary referrer data includes one or more search terms entered by a user. The secondary referrer data may include one or more parameters used to select the second content items presented on the second resource.

The method may further include, at the server: receiving the second set of data packets; parsing the second set of data packets to identify one or more parameters, determining whether the application indicated by the deeplink is installed on the computing device and providing the application indicated by the deeplink in response to a determination that the application indicated by the deeplink is not installed on the computing device, and determining content to be displayed in the application indicated by the deeplink based on the one or more parameters.

Another implementation relates to a system including at least one computing device operably coupled to at least one memory. The at least one computing device is configured to perform the illustrative method set out above. In another implementation, the at least one computing device is configured to receive, via a first application, a first set of one or more data packets indicating a command to navigate from a first resource to a second resource. The first set of data packets identifies the second resource and secondary referrer data associated with at least one of the first resource or a first content item selected on the first resource to generate the first set of data packets. The at least one computing device is further configured to render, within the first application, the second resource and a second content item provided within the second resource. The at least one computing device is further configured to receive, via the first application, a selection of the second content item. The at least one computing device is further configured to, in response to the selection of the second content item, generate a second set of one or more data packets including the secondary referrer data extracted from the first set of data packets and primary referrer data associated with at least one of the second resource or the second content item. The at least one computing device is further configured to transmit the second set of data packets to a server. The at least one computing device is further configured to receive, from the server, a deeplink generated by the server using both the primary referrer data and the secondary referrer data. The at least one computing device is further configured to render, within a second application indicated by the deeplink, a content interface having content generated in accordance with the deeplink.

In some implementations, the deeplink includes a uniform resource locator (URL) or uniform resource identifier (URI) partially including a referrer field including parameters relating to the primary referrer data and the secondary referrer data. The parameters may be one of common gateway interface (CGI) parameters and parameters generated from a key-value pair map.

In some implementations, rendering a content interface on the second application includes downloading the second application from the server. The deeplink may include a referrer tag including parameters representative of the primary referrer data and the secondary referrer data.

In some implementations, the secondary referrer data includes one or more search terms entered by a user. In some implementations, the secondary referrer data includes one or more parameters used to select the first content item presented on the first resource.

In some implementations, the server is configured to: receive the second set of data packets, parse the second set of data packets to identify one or more parameters, determine whether the second application is installed on the computing device and provide the second application in response to a determination that the second application is not installed on the computing device, and determine content to be displayed in the second application based on the one or more parameters.

In some implementations, the first set of data packets are received from a resource of a third application.

Another implementation relates to a method. The method includes receiving, via a first application of a computing device, a first set of one or more data packets indicating a command to navigate from a first resource to a second resource. The first set of data packets identifies the second resource and secondary referrer data associated with at least one of the first resource or a first content item selected on the first resource to generate the first set of data packets. The method further includes rendering, within the first application of the computing device, the second resource and a second content item provided within the second resource. The method further includes receiving, via the first application of the computing device, a selection of the second content item. The method further includes in response to the selection of the second content item, generating, at the computing device, a second set of one or more data packets including the secondary referrer data extracted from the first set of data packets and primary referrer data associated with at least one of the second resource or the second content item. The method further includes transmitting, at the computing device, the second set of data packets to a server. The method further includes receiving, from the server at the computing device, a deeplink generated by the server using both the primary referrer data and the secondary referrer data. The method further includes rendering, within a second application on the computing device indicated by the deeplink, a content interface having content generated in accordance with the deeplink.

In some implementations, the deeplink includes a uniform resource locator (URL) or uniform resource identifier (URI) partially including a referrer field including parameters relating to the primary referrer data and the secondary referrer data. The parameters may be one of common gateway interface (CGI) parameters and parameters generated from a key-value pair map.

In some implementations, rendering a content interface on the second application includes downloading the second application from the server. The deeplink includes a referrer tag including parameters representative of the primary referrer data and the secondary referrer data.

In some implementations, the secondary referrer data includes one or more search terms entered by a user. In some implementations, the secondary referrer data includes one or more parameters used to select the first content item presented on the first resource.

In some implementations, the method further includes, at the server: receiving the second set of data packets, parsing the second set of data packets to identify one or more parameters, determining whether the second application is installed on the computing device and providing the second application in response to a determination that the second application is not installed on the computing device, and determining content to be displayed in the second application based on the one or more parameters.

In some implementations, the first set of data packets are received from a resource of a third application.

Another implementation relates to a method. The method includes receiving, at a server from a computing device, a set of data packets. The set of data packets includes secondary referrer data associated with at least one of a first resource or a first content item provided within the first resource and primary referrer data associated with at least one of a second resource or a second content item provided within the second resource, the computing device having navigated from the first resource to the second resource after selection of the first content item in the first resource. The set of data packets are received at the server in response to selection of the second content item in the second resource on the computing device. The method further includes parsing the set of data packets to identify one or more parameters. The method further includes determining content to be displayed in an application on the computing device based on the one or more parameters. The method further includes generating a deeplink based on the content to be displayed in the application. The method further includes transmitting the deeplink to the application on the computing device.

In some implementations, the method further includes determining whether an application to be opened on the computing device is installed on the computing device. In response to a determination that the application is not installed on the user device, the server is configured to either provide the application for download by the computing device or to cause an application store to provide the application for download by the computing device.

In some implementations, the deeplink includes one of a uniform resource locator (URL) and a uniform resource identifier (URI) partially includes a referrer field including parameters relating to the primary referrer data and the secondary referrer data. The parameters may be one of common gateway interface (CGI) parameters and parameters generated from a key-value pair map. The deeplink may include a referrer tag including parameters representative of the primary referrer data and the secondary referrer data.

BRIEF DESCRIPTION OF THE DRAWINGS

The details of one or more implementations of the subject matter described in this specification are set forth in the accompanying drawings and the description below. Other features, aspects, and advantages of the subject matter will become apparent from the description, the drawings, and the claims.

FIG. 2 is a detailed block diagram illustrating a process of transmitting secondary referrer data and primary referrer data between multiple resources and applications on a user device according to an illustrative implementation.

FIG. 3 is a detailed block diagram illustrating a process of a user device providing secondary referrer data and primary referrer data to an application server according to an illustrative implementation.

DETAILED DESCRIPTION

Figure 1:
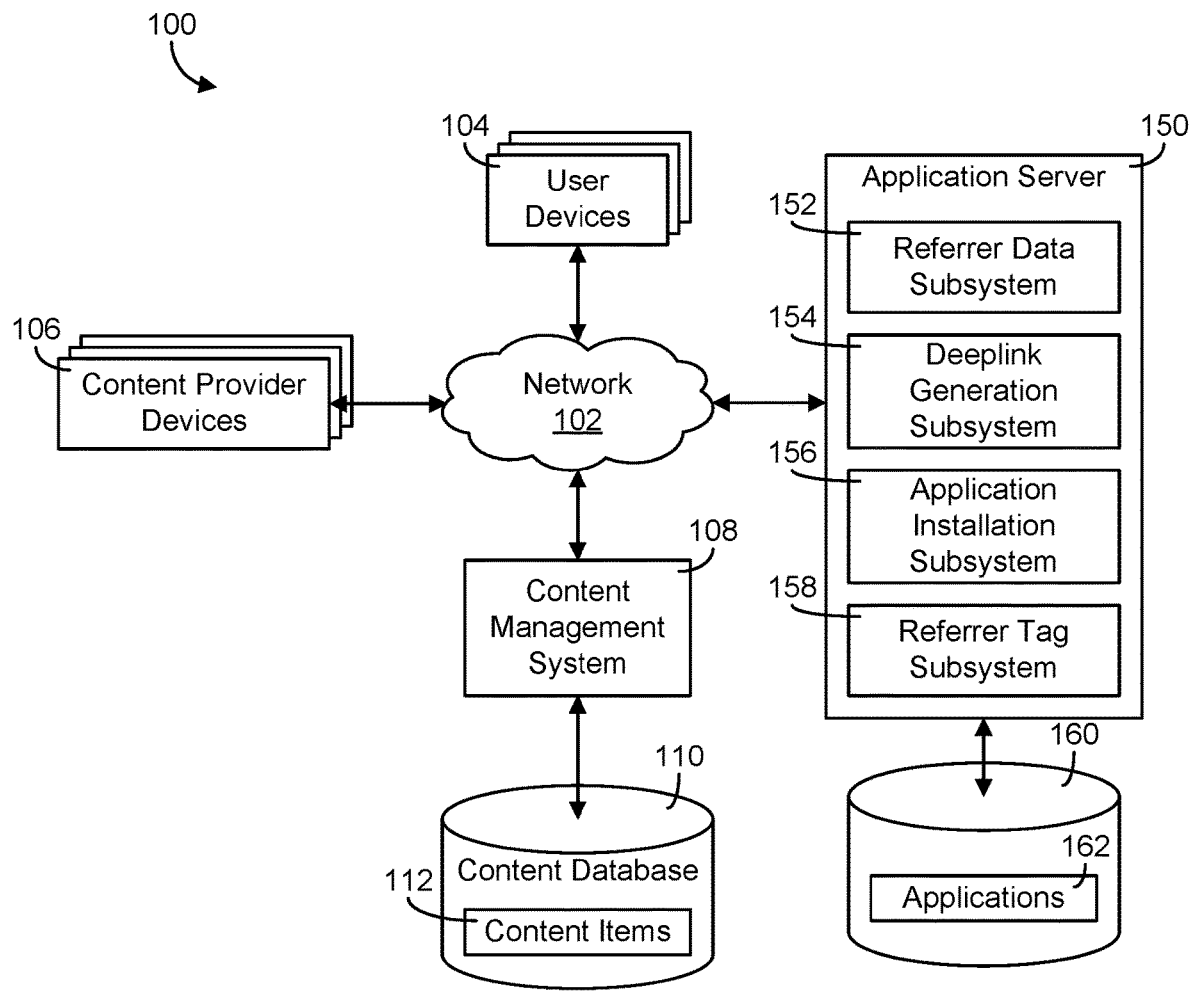
FIG. 1 is a block diagram of an application server and associated environment according to an illustrative implementation.

Following below are more detailed descriptions of various concepts related to, and implementations of, methods, apparatuses, and systems for providing information using a computer network. The various concepts introduced above and discussed in greater detail below may be implemented in any of numerous ways as the described concepts are not limited to any particular manner of implementation. Examples of specific implementations and applications are provided primarily for illustrative purposes.

Referring generally to the figures, various illustrative systems and methods are described for using referrer data at an application server to generate a deeplink for an application when a user is directed to the application from a content item. More particularly, systems and methods for providing secondary or tertiary referrer data to the application server as part of the referrer data are described.

When the user selects a content item provided within an application or another resource (e.g., a webpage), the selection can cause an application associated with the content item to be opened on the user device of the user. An application may receive information when it is opened on the user device, allowing the application to present relevant content to the user. The information may be provided by way of a deeplink, received from an application server, that causes a specific interface within the application to be opened (e.g., a customized interface including specific relevant content relating to user activity). The deeplink is representative of primary referrer data (e.g., information about the webpage that displayed the content item that was just selected, and the content item itself). This allows the application to provide content relating to what the user was viewing (in some implementations, without the application itself receiving the primary referrer data). However, this method may be limited based on the limited amount of information the application server uses to create the deeplink. The primary referrer data might not capture what led the user to the original application or resource within the application (e.g., a browser page from which the user linked to the application). For example, assume the user performed a search (e.g., "country music") within a search engine and clicked on a result on a first webpage that led to a second webpage, and then selected a content item within the second webpage that would cause a particular country music video to open within a media player application. The application server, when generating the deeplink that would cause the video to open in the application along with additional content, would not be aware of the search because there is no mechanism for providing the application server with more referrer data than just the primary referrer data (data about the second webpage). Therefore, when the application is launched with the video, the other content presented might be less relevant to the user because the deeplink was not created using information about the search (or other additional context leading up to the selection of the content item). In some implementations, the primary referrer data may be provided to the client-side application on the user device, rather than or in addition to an application server that generates a deeplink for the application, and the client-side application may generate/customize interface elements within the application based on the data.

The disclosure generally to relates to providing a mechanism for providing multiple levels of referrer data to an application or application server, allowing the application/application server to generate a more contextually relevant user experience within the application (e.g., allow the application server to provide a deeplink that will provide a more contextually relevant user experience). This allows the application to provide content more relevant to the user, and more representative of the multiple steps that the user took before opening the application. The additional levels of referrer data (e.g., secondary referrer data) may be provided to the application server at the time of selection of a content item, in some implementations.

The application server can generally receive referrer data, including primary referrer data and secondary referrer data, from a user device upon the selection of a content item on the use device. In various implementations, there may be different methods of providing the deeplink to an application on the user device, based on whether the application to be launched on the user device is already installed on the user device. In either case, deep linking techniques may be used to relay the secondary referrer data to the application to be launched. Deep linking techniques allow a destination application (or other resource such as a webpage) to receive information about a referring resource, thereby expediting the provision of content by the application. In this way, deep linking allows for more efficient navigation to particular resources provided by a destination application by reducing the need to perform additional searches or to follow further links within the destination application. Deep linking can thereby increase the efficiency in reaching content relevant to the user and reduce computational resources on the user device to reach the desired content, as the content is surfaced in a single step rather than via a series of interactions of the user within the application. Additionally, deep linking can help reduce network utilization and increase available bandwidth due to the reduced number of content requests and responses transmitted between the user device and the server in response to the multiple user interactions to retrieve the desired content.

In some implementations, for an application server providing a deeplink to an application, the application may already be installed on the user device. An endpoint for the deeplink may be constructed by the application server. In some such implementations, the endpoint is represented by a URL with a custom scheme, for example, using either CGI parameters or an intent with a key-value pair map for parameters. The parameters can represent both the secondary referrer data and the primary referrer data. The endpoint is used by the application to load content within the application relevant to the user.

In some implementations, for an application server providing a deeplink to an application, the application may not be installed on the user device. In such implementations, the application server uses a referrer tag to provide information relating to the secondary referrer data. The referrer tag may be provided to the application through an application store (e.g., a location at which the application can be downloaded by the user device). The referrer tag may generally be used to identify what activity led to the installation of an application (e.g., the referrer tag may generally include primary referrer data received from a user device that identifies an activity such as a selection of a download button). However, as described in the present disclosure, additional data, such as secondary referrer data (and further primary referrer data if applicable) may be represented within the referrer tag. The application server may modify the referrer tag to include a representation of the secondary referrer data. After the application is installed on the user device, the application server or application store may pass the modified referrer tag, and the application can treat the tag as a navigation endpoint when loading content within the application. Additionally or alternatively, an application server or the referring application may cause the application to be installed on the device, and the application server may subsequently generate a deeplink based on received primary and secondary referrer data and transmit the deeplink to the application.

In either case, after the application receives the navigation endpoint from the application server, the endpoint is used to populate the application with content. The application passes variables from the endpoint to a content server. The content server may use the endpoint to generally identify how the user reached the original application. For example, the content server may generally identify, using the endpoint, if the user reached the original application via a very specific or narrow topic search. The content server can then respond with the appropriate content (e.g., content relating to the very specific topic the user searched for, or more generic content relating to a very broad topic search). This may lead to several different experiences for different users selecting the same content item on a resource. If the user searched for a specific music video originally, then the server may provide content relating to the specific music video or the artist of the music video. If the user did a generic music video search, the server may provide different music videos from different artists in the same genre.

For situations in which the systems discussed herein collect and/or utilize personal information about users, or may make use of personal information, the users may be provided with an opportunity to control whether programs or features may collect personal information (e.g., information about a user's social network, social actions or activities, a user's preferences, a user's current location, etc.), or to control whether and/or how to receive content from the content management system that may be more relevant to the user. In addition, certain data may be anonymized in one or more ways before it is stored or used, so that personally identifiable information is removed when generating parameters (e.g., demographic parameters). For example, a user's identity may be anonymized so that no personally identifiable information can be determined for the user, or a user's geographic location may be generalized where location information is obtained (such as to a city, ZIP code, or state level), so that a particular location of a user cannot be determined. Thus, the user may have control over how information is collected about him or her and used by a content server. Further, the individual user information itself is not surfaced to the content provider, so the content provider cannot discern the interactions associated with particular users.

Referring now to FIG. 1, and in brief overview, a block diagram of an application server 150 and associated environment 100 is shown according to an illustrative implementation. One or more user devices 104 may be used by a user to perform various actions and/or access various types of content, some of which may be provided over a network 102 (e.g., the Internet, LAN, WAN, etc.). For example, user devices 104 may be used to access webpages (e.g., using an Internet browser), media files, and/or any other types of content. A content management system 108 may be configured to select content for display to users within resources (e.g., webpages, applications, etc.) and to provide content items 112 from a content database 110 to user devices 104 over network 102 for display within the resources. The content items from which content management system 108 selects may be provided by one or more content providers via network 102 using one or more content provider devices 106. In some implementations, content management system 108 may select one or more content items from one or more content providers among a plurality of content items from a plurality of content providers. In such implementations, content management system 108 may determine content to be published in one or more content interfaces of resources (e.g., webpages, applications, etc.) shown on user devices 104 based at least in part on metrics or other characteristics of the content items or content providers.

An application server 150 may be configured to receive referrer data from user devices 104. Referrer data may generally include information relating to the user's activities, such as a search performed by a user, a topic or subject of a webpage the user is viewing, and the like. Referrer data may include primary referrer data (e.g., data from the current resource the user is viewing) and secondary referrer data (e.g., data relating to one or more resources the user previously viewed before viewing the current resource). Application server 150 generates a deeplink based on the referrer data. The deeplink is generally a link that links to a specific location within the application (e.g., a specific piece of content and/or content interface served by a media application, a specific webpage within a browser application, etc.). For example, a deeplink may be used to identify content to be presented in the application based on the deeplink. The identified content may be searchable or indexed by a content source providing the content, in some implementations. The application then retrieves, formats, and displays the content from the content source.

As one example of application server 150 activity, referrer data may relate to a user activity of viewing a country music video on a webpage. The referrer data may identify the song or artist, and may also identify the activity of the user that led to the user viewing the country music video (e.g., a search for the specific artist or music video). Application server 150 may receive the referrer data and generate a deeplink that references the particular music video, song, or artist. The deeplink may further reference a search or other activity that the user performed in reaching the country music video. The deeplink may be received from application server 150 by the application on user device 104, and the application may use the deeplink to access content which ultimately relates to the original user activity. The content is then formatted and displayed on the application on user device 104. The content may be provided from any source via network 102.

Referring in greater detail to FIG. 1, user devices 104 and/or content provider devices 106 may be any type of computing device (e.g., having a processor and memory or other type of computer-readable storage medium), such as a television and/or set-top box, mobile communication device (e.g., cellular telephone, smartphone, etc.), computer and/or media device (desktop computer, laptop or notebook computer, netbook computer, tablet device, gaming system, etc.), or any other type of computing device. In some implementations, one or more user devices 104 may be set-top boxes or other devices for use with a television set. In some implementations, content may be provided via a web-based application and/or an application resident on a user device 104. In some implementations, user devices 104 and/or content provider devices 106 may be designed to use various types of software and/or operating systems. In various illustrative implementations, user devices 104 and/or content provider devices 106 may be equipped with and/or associated with one or more user input devices (e.g., keyboard, mouse, remote control, touchscreen, etc.) and/or one or more display devices (e.g., television, monitor, CRT, plasma, LCD, LED, touchscreen, etc.).

User devices 104 and/or content provider devices 106 may be configured to receive data from various sources using a network 102. In some implementations, network 102 may include a computing network (e.g., LAN, WAN, Internet, etc.) to which user devices 104 and/or content provider device 106 may be connected via any type of network connection (e.g., wired, such as Ethernet, phone line, power line, etc., or wireless, such as WiFi, WiMAX, 3G, 4G, satellite, etc.). In some implementations, network 102 may include a media distribution network, such as cable (e.g., coaxial metal cable), satellite, fiber optic, etc., configured to distribute media programming and/or data content.

Content management system 108 may be configured to select third-party content items to be presented on a resource. For example, content management system 108 may conduct an auction or bidding process. One or more content items of one or more winners of the auction or bidding process can be selected for display on the resource. Content management system 108 may further use a quality score (i.e., a measure of how likely a user of user device 104 is to interact with the content item or take a conversion action related to the content item) or other metric during the process of selection of the content item. Content providers, in some implementations, may create a content campaign, or may otherwise provide various settings or guidelines to content management system 108. Such settings or guidelines may govern how the content provider participates in the content item selection process (e.g., how much to bid in a given auction, a total budget (weekly, daily, or otherwise) for the content provider, etc.). Such settings or guidelines may be set based on various metrics for the content items, such as a cost per impression or cost per thousand impressions (CPM), a cost per click (CPC), or a cost per acquisition (CPA) or cost per conversion. Such settings or guidelines may further be set based on the type of platform on which a content item should be provided (e.g., mobile, desktop, etc.), what type of resource on which a content item should be provided (e.g., a search results page), a geographic location of the user device displaying the resource, and the like.

A user may be able to interact with a content item presented on the resource on user device 104. Such interactions may include a click, double click, touch on a touchscreen, or any other type of interaction that indicates the selection of the content item. In some implementations, the selection of the content item may cause user device 104 to be directed to open an application on the device. In other implementations, the selection of the content item may cause user device 104 to provide referrer data to application server 150 (described below), and the deeplink received back from application server 150 may cause the application to be opened on user device 104. The application may then retrieve content relevant to the user and the content item and display the content within the application. In some implementations, the content item may be associated with the application. For example, if the user is currently viewing a webpage associated with music, the content item may be associated with an application configured to play back music, to allow a user to view a list of songs that can be consumed by the user, etc.

As described above, application server 150 is configured to receive referrer data from user devices 104. When the user selects a content item that causes an application to be opened on user device 104, application server 150 may receive an indication of the selection of the content item and additional information (e.g., referrer data) from user device 104. Application server 150 may generate a deeplink, which may be sent to user device 104 and used by the application to retrieve content relevant to the user.

Application server 150 is shown to include a referrer data subsystem 152. Referrer data subsystem 152 may receive referrer data from user device 104 and identify data that can be used during generation of a deeplink. For example, if the referrer data includes data relating to a search that the user performed, referrer data subsystem 152 may identify the search terms of the search. As another example, the referrer data may include information about a webpage on which the content item was presented, and referrer data subsystem 152 may identify specific content within the webpage that can be used to construct a deeplink.

Application server 150 is shown to include a deeplink generation subsystem 154. Deeplink generation subsystem 154 may be configured to generate a deeplink based on the referrer data. In some implementations, the deeplink may be a uniform resource locator (URL) or uniform resource identifier (URI) with an endpoint constructed using the referrer data. For example, for a URL http://www.example-.com of a webpage, an endpoint (e.g., "/path/page") may be constructed for the URL to create the deeplink. The endpoint may cause the content server to access indexed content related to the endpoint, therefore allowing relevant content to be presented to the user via the application through the endpoint.

In some implementations, the endpoint may be constructed by deeplink generation subsystem 154 using common gateway interface (CGI) parameters. Using CGI parameters, a web server configured to respond to requests for a webpage from a web browser can provide content (e.g., a new webpage with relevant content) based on the identified parameters. In some implementations, the endpoint may be constructed using a key-value pair map. A key-value pair may generally be a linked data set including the key (e.g., an identifier) and the value (e.g., a value identifying referrer data). The web server providing content for the application may use a lookup table with the key-value pair to determine content to be presented on the application.

In some implementations, when the user selects a content item to direct an application to be opened on user device 104, the application may already be installed on the user device. In such a case, user device 104 may provide referrer data to application server 150, and the application may receive a deeplink in response from application server 150.

The deeplink is then used to retrieve content from a web server to be displayed within the application.

In some implementations, the application to be opened on the user device may not be installed on the user device. In such implementations, the application may be downloaded from application server 150. Application server 150 is shown to include an application installation subsystem 156 configured to facilitate the installation of an application 162 on user device 104. Application 162 may be retrieved from a local or remote database 160.

If the application is to be downloaded to user device 104, the deeplink may be provided to the application in the form of a referrer tag by application server 150. Application server 150 is shown to include a referrer tag subsystem 158 configured to generate a referrer tag (or modify an existing referrer tag). The referrer tag may generally be a tag generated by application server 150 to represent information about what led to the installation of application 162 on user device 104. The referrer tag may typically include, for example, primary referrer data. However, referrer tag subsystem 158 may be configured to further include secondary referrer data received by application server 150 within the tag. When application 162 is installed and opened on user device 104, the referrer tag may be used to determine content to be initially presented within the application.

In various implementations, the activities of application server 150 may be split across multiple servers. For example, user device 104 may be configured to download an application to be loaded on the user device from another source other than application server 150, but may still receive a modified referrer tag from application server 150. It should be understood that the configuration shown in FIG. 1 is not limiting and that various activities relating to the presentation of an application on user device 104 may be provided by either application server 150 or another system connected within environment 100 to user device 104.

Referring to FIG. 2, a detailed block diagram illustrating a process of relaying secondary referrer data from a first resource to a second resource is shown, according to an illustrative implementation. As described above, secondary referrer data, along with primary referrer data, may be used to generate a deeplink. Primary referrer data may generally relate to a current resource (e.g., current webpage the user is currently viewing), while secondary referrer data may generally relate to a previous resource (e.g., previous webpages the user was viewing before reaching the current webpage). Referring specifically to FIG. 2, a process of passing secondary referrer data from a previous resource to a current resource is described in greater detail.

A user may be viewing a first resource 202 on a first application 204 on user device 104. First resource 202 may include any number of content items 206, links, pictures, text, and other content as generally found on a resource. User device 104 may receive a selection from a user that causes a second resource 212 on a second application 214 to be presented on user device 104. The selection may be, for example, the selection of a content item 206 causing a new application to open or the selection of a link to open a new webpage in the same application. Second resource 212 may be presented on second application 214 with any number of content items 216, links, pictures, text, and other content presented based on the user selection on the first resource.

It should be understood that while first resource 202 and second resource 212, and first application 204 and second application 214 are differentiated from one another in FIG. 2, first resource 202 and second resource 212 may be the same resource, and first application 204 and second application 214 may be the same application. In other words, no new application may be opened or no new resource loaded upon a user selection. The implementation shown in FIG. 2 is shown to differentiate the two resources and applications for ease of explanation in situations where a new resource or application are loaded, but the systems and methods described herein are not limiting to such cases.

When navigating from first resource 202 to second resource 212, secondary referrer data 220 may be passed to second resource 212 and second application 214. Secondary referrer data 220 may generally include information relating to first resource 202. For example, if first resource 202 was a search results webpage, and the user selection was the selection of a search result, secondary referrer data 220 may identify the search terms entered by the user that caused the generation of the search results. As another example, if the user selection was the selection of a content item 206, secondary referrer data 220 may include data relating to the decision to provide content item 206 for display on first resource 202. If content item 206 was provided as part of a content item campaign, secondary referrer data 220 may identify information relating to the campaign, thereby indicating information that may be relevant to the user viewing first resource 202.

Secondary referrer data 220 generally is used to capture the intent of the user that led to the loading of second resource 212 on second application 214. Using the country music example used above, in a first example, the user may have performed a general search for country music, and then selected a particular song from a list of songs provided as search results. Secondary referrer data 220 may be used to identify that the user did a general search for country music and not for a particular song. In a second example, the user may have performed a general search for all genres of music, and then selected a particular country music song from a list of search results. Secondary referrer data 220 may be used to identify that the user merely has an interest in music in general. In a third example, the user may have performed a search for a specific song, and then selected a link to the song. Secondary referrer data 220 may be used to identify a user interest in the specific song or artist of the song.

As another example, the user may be shopping via first resource 202 and may be presented with a plurality of content items related to items available for purchase. If the user is shopping (e.g., for a jacket), secondary referrer data 220 may identify one or more search parameters entered by the user (e.g., the type of jacket, the color of the jacket, etc.). When the user selection (e.g., the selection of a content item) occurs, secondary referrer data 220 is generated based on the parameters entered by the user to initiate the shopping process.

Secondary referrer data 220 may further be used to identify other information of interest, such as if the user was intending to make a purchase, how the user reached first resource 202 and first application 204, and the like. Secondary referrer data 220 may be carried over from multiple user selections and navigations, i.e., user information may be determined across multiple user selections on multiple resource and applications.

In various implementations, secondary referrer data 220 may be represented within second resource 212, second application 214, and/or content item 216. For example, if second resource 212 or second application 214 is the same as first resource 202 or first application 204, secondary referrer data 220 may be stored within the resource or application. As another example, if the resource and/or application changed, secondary referrer data 220 may be associated with the new resource and/or application, or may be associated with content item 216.

Referring now to FIG. 3, a detailed block diagram illustrating a process of transmitting secondary referrer data and primary referral data to an application server is shown, according to an illustrative implementation. In FIG. 3, the user has reached second resource 212 on second application 214 as described with reference to FIG. 2. Second resource 212 may include any number of content items 216, links, pictures, text, and other content as generally found on a resource. User device 104 may receive a selection from a user of a content item 216. The selection of content item 216 may generally cause a third application 224 to be opened on user device 104 with a third resource 222 and new content 226 to be displayed within the resource.

Content item 216 may be a content item specifically associated with third application 224. For example, referencing the shopping example above, content item 216 may specifically be associated with a shopping-based application that allows the user to shop for jackets. As another example, referencing the music example above, content item 216 may specifically be associated with a music application configured to play back music on user device 104.

The user selection of content item 216 may cause third application 224 to be launched or installed on user device 104. If third application 224 is already installed, the application may be launched, and a deeplink 232 received from application server 150 (described in detail below) is used to generate content for display within the application. If third application 224 is not installed on user device 104, then the application may be downloaded (e.g., from application server 150 or another server) and installed on user device 104. A referrer tag 234 accompanying the download, provided by application server 150 or another server, is then used to retrieve content for display within the application as the application is first launched.

When the user selects content item 216, referral information is provided to application server 150 by user device 104. The referral information includes secondary referrer data 220, as described above, relayed from previous applications and resources viewed by the user. The referral information further includes primary referrer data 230, directly relating to second resource 212, second application 214, and the content item 216 that was selected. For example, primary referrer data 230 may include information relating to the selection of content item 216 for display on second resource 212. As another example, primary referrer data 230 may include information about the other content being displayed on second resource 212 (e.g., using the country music example, primary referrer data 230 may identify the specific song being played back, or the artist of the song). As yet another example, primary referrer data 230 may identify the type of resource (e.g., a specific webpage link) or type of application (e.g., browser) being used to view the content.

Application server 150 receives primary referrer data 230 and secondary referrer data 220 and may be configured to generate deeplink 232 for third application 224 based on the referrer data, as described above. In some implementations, application server 150 may determine whether third application 224 is already installed on user device 104, and may provide the application for download if user device 104 does not already have the application installed.

If user device 104 has third application 224 installed, application server 150 may be configured to generate deeplink 232 by constructing an endpoint for a URL or URI. For example, referring to the shopping example, if the referrer data indicates that the user was shopping for all types of jackets, the endpoint may make reference to jackets (e.g., "/jackets" or "/clothing/jackets"). As another example, referring to the country music example, if the referrer data indicates a user interest in a specific song, the endpoint may make reference to the specific song. As yet another example, if the referrer data indicates a general interest in music, the endpoint may make reference to music content in general without identifying country music as a particular genre. In some implementations, the endpoint may be constructed using CGI parameters. In other implementations, the endpoint may be constructed using a key-value pair map. In yet other implementations, any method of generating an endpoint for a deeplink may be used. Third application 224 may receive deeplink 232 and use deeplink 232 to retrieve content relevant to the user.

If user device 104 does not have third application 224 installed, application server 150 (or another system) may provide the application for download by the user device. Further, application server 150 may be configured to generate a referrer tag 234 for the application (or modify an existing referrer tag accompanying the download). Referrer tag 234 may generally include information indicating one or more actions leading to the installation of the application on user device 104. For example, referrer tag 234 may identify the particular content item 216 that was selected by the user to initiate the process. Referrer tag 234 may also include information about the selection of content item 216 for display on second resource 212. In other words, referrer tag 234 may include information generally included as part of primary referrer data 230.

Application server 150 may further use referrer tag 234 to provide third application 224 with information relating to secondary referrer data 220. For example, referrer tag 234 may generally include information about the selection of one or more content items 206 in first resource 202 of first application 204. Further, referrer tag 234 may identify a topic or other content of first resource 202, or of previous content viewed by the user.

Application server 150 may transmit referrer tag 234 to user device 104. Upon launching for the first time on user device 104, third application 224 may receive referrer tag 234 and use the tag to determine content to be displayed within the application. Referrer tag 234 may be of any format. For example, referrer tag 234 may be a HTTP header field.

Third application 224 may be configured, upon receiving either deeplink 232 or referrer tag 234, to retrieve content for display on the application. The type of content retrieved may vary based on the referrer data identified via deeplink 232 or referrer tag 234. For example, using the country music video example, third application 224 may provide a specific music video as a top recommendation on a homepage of the application. The specific music video may be chosen based on one or more specific songs or artists identified by deeplink 232 or referrer tag 234, or may be chosen based on a more generic search term identified by deeplink 232 or referrer tag 234. As another example, third application 224 may provide a list of music videos (e.g., a recommended playlist), selecting each music video in the list based on the information identified by deeplink 232 or referrer tag 234. Some of the items in the list may relate to primary referrer data (e.g., to a specific artist or song), while other items in the list may relate to secondary referrer data (e.g., other country music artists and songs, or songs from other genres that may be related to country music). As yet another example, third application 224 may open a channel page, the channel relating to a specific artist or genre.

Figure 4:
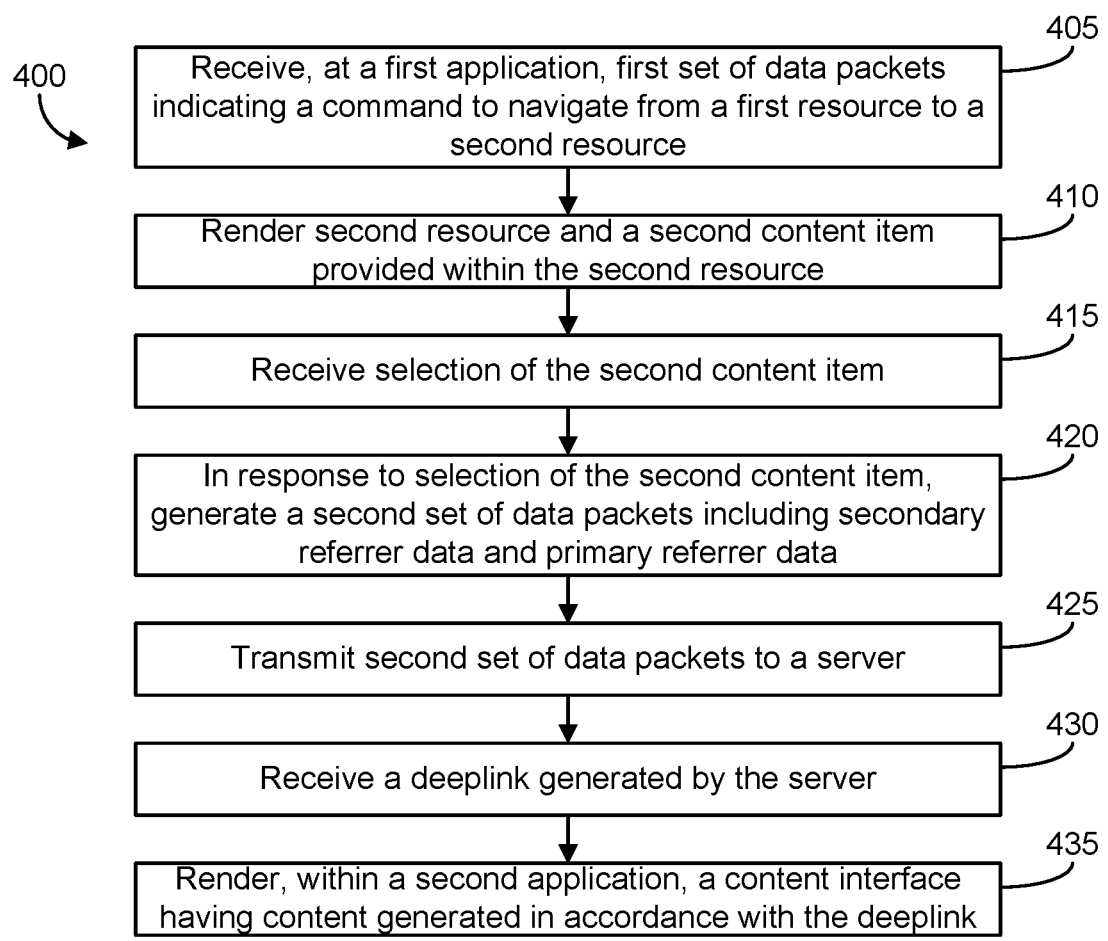
FIG. 4 is a flow diagram of a process for providing secondary referrer data and primary referrer data to an application according to an illustrative implementation.

Referring now to FIG. 4, a flow diagram of a process 400 for providing secondary referrer data and primary referrer data to an application is shown. Process 400 may be executed by a user device 104 communicating information to an application server 150, as described above.

Process 400 includes receiving, at a first application on a user device, a first set of one or more data packets indicating a command to navigate from a first resource to a second resource (405). The command may identify the second resource and secondary referrer data associated with at least one of the first resource or a first content item selected on the first resource to generate the first set of data packets. For example, the first resource may be a first webpage, and the command may identify a second webpage selected by a user, based on a selection of a particular content item or link on the first webpage. The secondary referrer data may, in such an example, refer to the content of the first webpage and the intent of the user while viewing the first webpage. For example, if the user performed a search, the secondary referrer data may refer to the search terms entered by the user. As another example, if one or more content items were selected for display on the first webpage, the secondary referrer data may refer to the parameters used to select the content items. The secondary referrer data may be passed from the first webpage to the second webpage via any method. In some implementations, secondary referrer data may be passed via a HTTP header field of the HTTP address used to navigate to the second webpage. In some implementations, secondary referrer data may be associated with content displayed on the second webpage. In some implementations, secondary referrer data may be stored locally on the browser.

Process 400 includes rendering the second resource and a second content item provided within the second resource (410). The second resource and second content item may be rendered within a first application of the user device (e.g., a browser or other user application). The second content item, and other content displayed on the second resource, may be chosen based on the selection of the user from the first resource. The second content item may, in some implementations, be associated with a second application. For example, the second application may be an application such as a media player, a browser, communications software, a word processor, database software, spreadsheet software, email program, presentation software, database software, or the like.

Process 400 includes receiving a selection of the second content item (415). In various implementations, the selection of the second content item may be a click, double click, hover event, a touch on a touchscreen, or any other type of event relating to a user action on the second content item.

Process 400 includes, in response to the selection of the second content item, generating a second set of one or more data packets (420). The second set of data packets may include the secondary referrer data identified at block 405 along with primary referrer data associated with at least one of the second resource or the second content item. The primary referrer data may generally identify, for example, information relating to the second resource (e.g., to the specific content displayed on the second resource). The primary referrer data may further relate to the selection of the particular second content item for display on the second resource.

Process 400 includes transmitting the second set of data packets to a server (425). The server may generally be configured to generate a deeplink based on the referral data in the second set of data packets. The server may receive the second set of data packets and parse the second set of data packets to identify one or more parameters (e.g., the primary referrer data and the secondary referrer data). The server may generate a deeplink using the parameters.

Process 400 includes receiving the deeplink generated by the server (430) and rendering, within a second application on the user device, a content interface having content generated in accordance with the deeplink (435). Rendering the content interface may generally include using the endpoint of the deeplink to retrieve indexed content from a remote source to be displayed on the second application.

Figure 5:
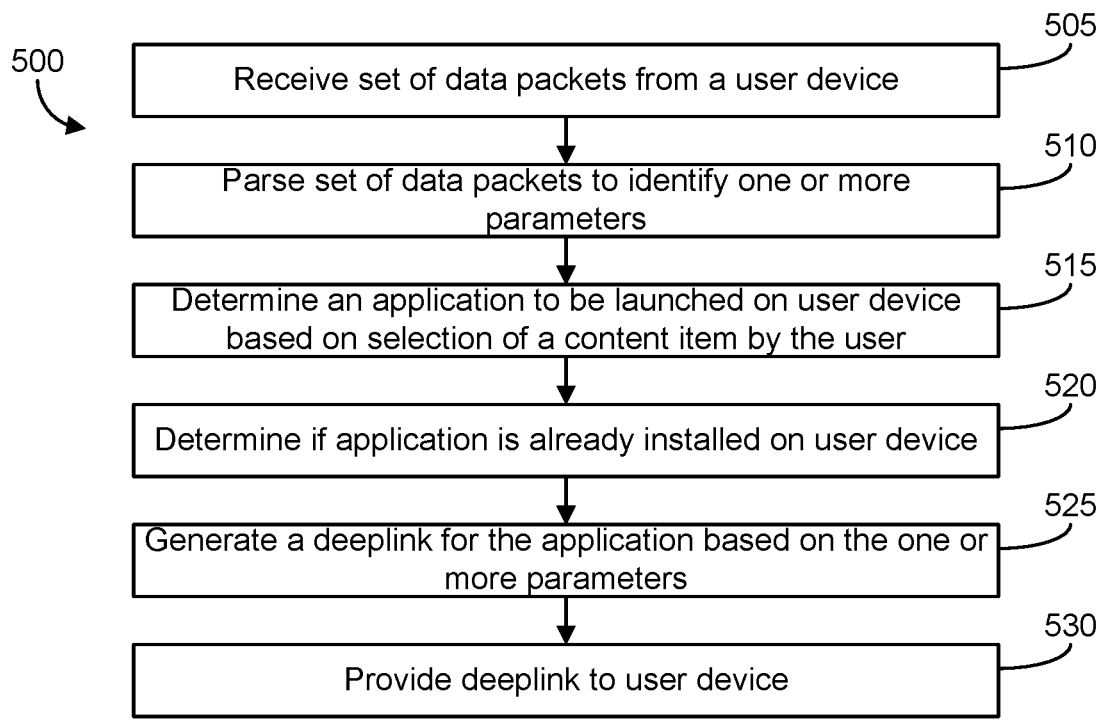
FIG. 5 is a flow diagram of a process for providing secondary referrer data and primary referrer data to an application installed on a user device according to an illustrative implementation.

Referring now to FIG. 5, a flow diagram of a process 500 for providing secondary referrer data and primary referrer data to an application is shown. In the example of FIG. 5, the application is already installed on a user device of the user. Process 500 may be executed by an application server 150, as described above.

Process 500 includes receiving a set of data packets from a user device (505). The set of data packets may include primary referrer data and secondary referrer data, and may be generated by an application of the user device upon selection of a content item in the application as described above. Process 500 includes parsing the set of data packets to identify one or more parameters (510). In various implementations, the parameters may identify primary referrer data and secondary referrer data to be included in a deeplink.

Process 500 further includes determining an application to be launched on the user device based on the selection of the content item by the user (515). Process 500 further includes determining if the application is already installed on the user device (520). Upon verifying that the application is installed on the user device, process 500 includes generating a deeplink for the application based on the one or more parameters (525) and providing the deeplink to the user device (530). The deeplink may then be used by the application to retrieve content related to the primary referrer data and the secondary referrer data.

Figure 6:
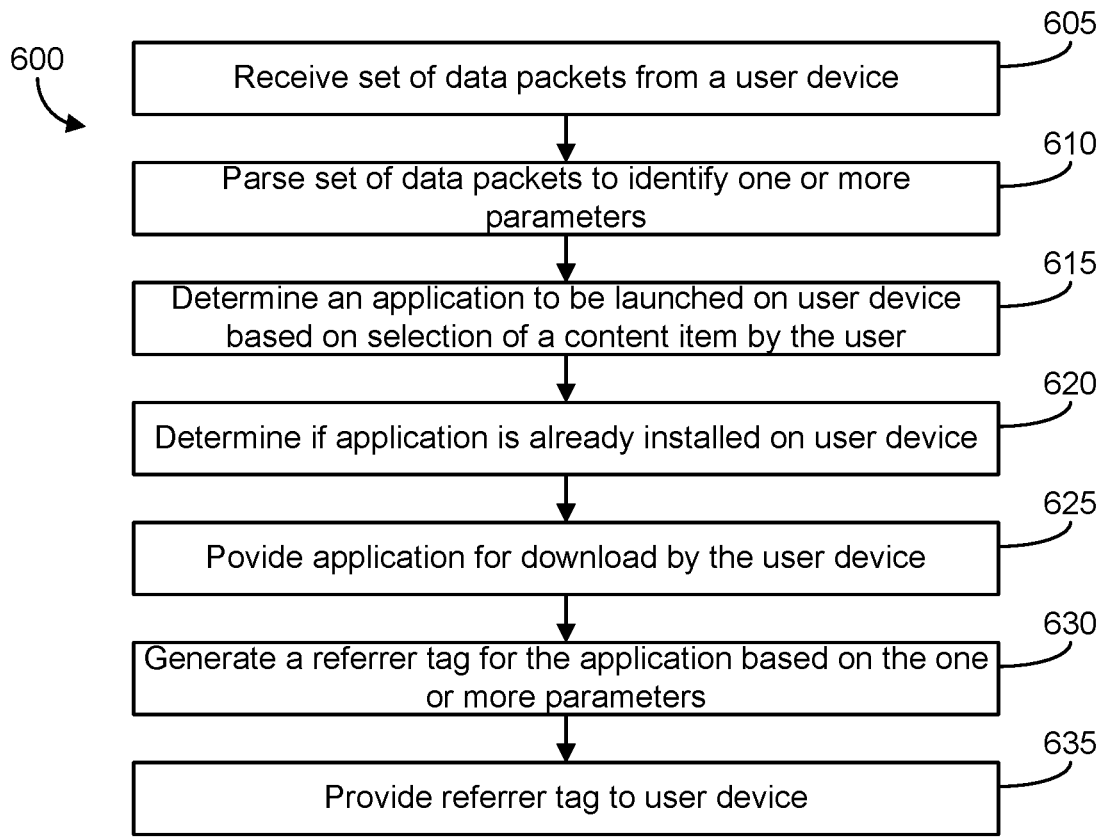
FIG. 6 is a flow diagram of a process for installing an application on a user device and providing secondary referrer data and primary referrer data to the application according to an illustrative implementation.

Referring now to FIG. 6, a flow diagram of a process 600 for providing secondary referrer data and primary referrer data to an application is shown. In the example of FIG. 6, the application is not installed on a user device of the user. Process 600 may be executed by an application server 150, as described above.

Process 600 includes receiving a set of data packets from a user device (605). The set of data packets may include primary referrer data and secondary referrer data, and may be generated by an application of the user device upon selection of a content item in the application as described above. Process 600 includes parsing the set of data packets to identify one or more parameters (610). In various implementations, the parameters may identify primary referrer data and secondary referrer data to be included in a deeplink.

Process 600 further includes determining an application to be launched on the user device based on the selection of the content item by the user (615). Process 600 further includes determining if the application is already installed on the user device (620). Upon verifying that the application is not installed on the user device, process 600 includes providing the application for download by the user device (625).

Process 600 further includes generating a referrer tag for the application based on the one or more parameters (630) and providing the referrer tag to the user device (635). The referrer tag may then be used by the application to retrieve content related to the primary referrer data and the secondary referrer data.

Figure 7:
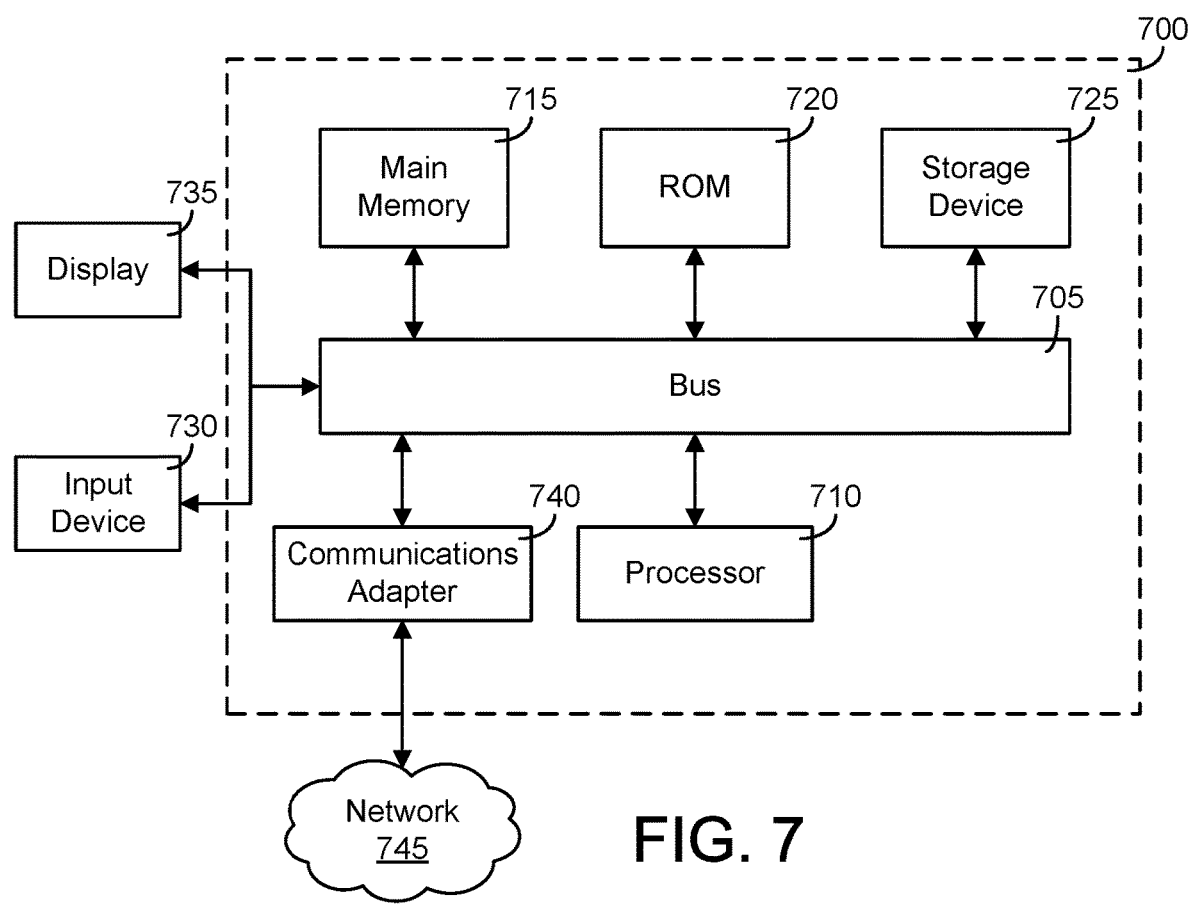
FIG. 7 is a block diagram of a computing system according to an illustrative implementation.

FIG. 7 illustrates a depiction of a computing system 700 that can be used, for example, to implement an illustrative user device 104, an illustrative content management system 108, an illustrative content provider device 106, an illustrative application server 150, and/or various other illustrative systems described in the present disclosure. Computing system 700 includes a bus 705 or other communication component for communicating information and a processor 710 coupled to bus 705 for processing information. Computing system 700 also includes main memory 715, such as a random access memory (RAM) or other dynamic storage device, coupled to bus 705 for storing information, and instructions to be executed by processor 710. Main memory 715 can also be used for storing position information, temporary variables, or other intermediate information during execution of instructions by processor 710. Computing system 700 may further include a read only memory (ROM) 1220 or other static storage device coupled to bus 705 for storing static information and instructions for processor 710. A storage device 725, such as a solid state device, magnetic disk or optical disk, is coupled to bus 705 for persistently storing information and instructions.

Computing system 700 may be coupled via bus 705 to a display 735, such as a liquid crystal display, or active matrix display, for displaying information to a user. An input device 730, such as a keyboard including alphanumeric and other keys, may be coupled to bus 705 for communicating information, and command selections to processor 710. In another implementation, input device 730 has a touch screen display 735. Input device 730 can include a cursor control, such as a mouse, a trackball, or cursor direction keys, for communicating direction information and command selections to processor 710 and for controlling cursor movement on display 735.

In some implementations, computing system 700 may include a communications adapter 740, such as a networking adapter. Communications adapter 740 may be coupled to bus 705 and may be configured to enable communications with a computing or communications network 745 and/or other computing systems. In various illustrative implementations, any type of networking configuration may be achieved using communications adapter 740, such as wired (e.g., via Ethernet®), wireless (e.g., via WiFi®, Bluetooth®, etc.), pre-configured, ad-hoc, LAN, WAN, etc.

According to various implementations, the processes that effectuate illustrative implementations that are described herein can be achieved by computing system 700 in response to processor 710 executing an arrangement of instructions contained in main memory 715. Such instructions can be read into main memory 715 from another computer-readable medium, such as storage device 725. Execution of the arrangement of instructions contained in main memory 715 causes computing system 700 to perform the illustrative processes described herein. One or more processors in a multi-processing arrangement may also be employed to execute the instructions contained in main memory 715. In alternative implementations, hard-wired circuitry may be used in place of or in combination with software instructions to implement illustrative implementations. Thus, implementations are not limited to any specific combination of hardware circuitry and software.

The systems and methods as described in the present disclosure may be implementable for any type of third-party content item (i.e., for any type of content item to be displayed on a resource). In one implementation, the content items may include advertisements. In one implementation, the content items may include any text, images, video, stories (e.g., news stories), social media content, links, or any other type of content provided by a third-party for display on the resource of a first-party content provider. The type of content item for which the methods herein are used for is not limiting.

Although an example processing system has been described in FIG. 7, implementations of the subject matter and the functional operations described in this specification can be carried out using other types of digital electronic circuitry, or in computer software, firmware, or hardware, including the structures disclosed in this specification and their structural equivalents, or in combinations of one or more of them.

Implementations of the subject matter and the operations described in this specification can be carried out using digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, i.e., one or more subsystems of computer program instructions, encoded on one or more computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium is both tangible and non-transitory.

The operations described in this specification can be implemented as operations performed by a data processing apparatus on data stored on one or more computer-readable storage devices or received from other sources.

The terms "data processing apparatus" or "computing device" encompass all kinds of apparatus, devices, and machines for processing data, including by way of example, a programmable processor, a computer, a system on a chip, or multiple ones, or combinations of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more subsystems, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example, semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be carried out using a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be carried out using a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

In some illustrative implementations, the features disclosed herein may be implemented on a smart television module (or connected television module, hybrid television module, etc.), which may include a processing circuit configured to integrate Internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services, a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate implementations, the features may be implemented on a laptop computer or other personal computer, a smartphone, other mobile phone, handheld computer, a tablet PC, or other computing device.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be carried out in combination or in a single implementation. Conversely, various features that are described in the context of a single implementation can also be carried out in multiple implementations, separately, or in any suitable subcombination. Moreover, although features may be described above as acting in certain combinations and even initially claimed as such, one or more features from a claimed combination can, in some cases, be excised from the combination, and the claimed combination may be directed to a subcombination or variation of a subcombination. Additionally, features described with respect to particular headings may be utilized with respect to and/or in combination with illustrative implementations described under other headings; headings, where provided, are included solely for the purpose of readability and should not be construed as limiting any features provided with respect to such headings.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products embodied on tangible media.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
receiving, via a first application of a computing device, a first set of one or more data packets indicating a command to navigate from a first resource to a second resource, the first set of data packets identifying the second resource and secondary referrer data associated with at least one of the first resource or a first content item selected on the first resource to generate the first set of data packets;
rendering, within the first application of the computing device, the second resource and a second content item provided within the second resource;
receiving, via the first application of the computing device, a selection of the second content item;
in response to the selection of the second content item, generating, at the computing device, a second set of one or more data packets comprising the secondary referrer data extracted from the first set of data packets and primary referrer data associated with at least one of the second resource or the second content item;
transmitting, by the computing device, the second set of data packets to an application server;
receiving, from the application server at the computing device, a deeplink generated by the application server using both the primary referrer data and the secondary referrer data;
obtaining, via the second application by the computing device, a third content item from the application server using the primary referrer data and the secondary referrer data included in the deeplink, the third content item to be displayed within the second application on the computing device; and
rendering, within the second application on the computing device indicated by the deeplink, a content interface having the third content item generated using the secondary referrer data and the primary referrer data included in the deeplink.

2. The method of claim 1, wherein the deeplink comprises one of a uniform resource locator (URL) and a uniform resource identifier (URI) partially comprising a referrer field including parameters relating to the primary referrer data and the secondary referrer data.

3. The method of claim 2, wherein the parameters are one of common gateway interface (CGI) parameters and parameters generated from a key-value pair map.

4. The method of claim 1, wherein rendering the content interface on the second application comprises downloading the second application from the application server; and wherein the deeplink comprises a referrer tag comprising parameters representative of the primary referrer data and the secondary referrer data.

5. The method of claim 1, wherein the secondary referrer data comprises one or more search terms entered by a user.

6. The method of claim 1, wherein the secondary referrer data comprises one or more parameters used to select the first content item presented on the first resource.

7. The method of claim 1, further comprising, at the application server:
receiving the second set of data packets;
parsing the second set of data packets to identify one or more parameters;
determining whether the second application is installed on the computing device and providing the second application in response to a determination that the second application is not installed on the computing device; and
determining content to be displayed in the second application based on the one or more parameters.

8. The method of claim 1, wherein the first set of data packets are received from a resource of a third application.

9. A system, comprising:
at least one computing device operably coupled to at least one memory and configured to:
receive, via a first application, a first set of one or more data packets indicating a command to navigate from a first resource to a second resource, the first set of data packets identifying the second resource and secondary referrer data associated with at least one of the first resource or a first content item selected on the first resource to generate the first set of data packets;
render, within the first application, the second resource and a second content item provided within the second resource;
receive, via the first application, a selection of the second content item;
in response to the selection of the second content item, generate a second set of one or more data packets comprising the secondary referrer data extracted from the first set of data packets and primary referrer data associated with at least one of the second resource or the second content item;

transmit the second set of data packets to an application server;

receive, from the application server, a deeplink generated by the application server using both the primary referrer data and the secondary referrer data;

obtain, via the second application, a third content item from the application server using the primary referrer data and the secondary referrer data included in the deeplink, the third content item to be displayed within the second application on the computing device; and render, within the second application indicated by the deeplink, a content interface the third content item generated using the secondary referrer data and the primary referrer data included in the deeplink.

10. The system of claim 9, wherein the deeplink comprises one of a uniform resource locator (URL) and a uniform resource identifier (URI) partially comprising a referrer field including parameters relating to the primary referrer data and the secondary referrer data.

11. The system of claim 10, wherein the parameters are one of common gateway interface (CGI) parameters and parameters generated from a key-value pair map.

12. The system of claim 9, wherein rendering the content interface on the second application comprises downloading the second application from the application server; and wherein the deeplink comprises a referrer tag comprising parameters representative of the primary referrer data and the secondary referrer data.

13. The system of claim 9, wherein the secondary referrer data comprises one or more search terms entered by a user.

14. The system of claim 9, wherein the secondary referrer data comprises one or more parameters used to select the first content item presented on the first resource.

15. The system of claim 9, wherein the application server is configured to:
   receive the second set of data packets;
   parse the second set of data packets to identify one or more parameters;
   determine whether the second application is installed on the computing device and provide the second application in response to a determination that the second application is not installed on the computing device; and
   determine content to be displayed in the second application based on the one or more parameters.

16. The system of claim 9, wherein the first set of data packets are received from a resource of a third application.

17. A method, comprising:
   receiving, at an application server from a computing device, a set of data packets, the set of data packets comprising:
      secondary referrer data associated with at least one of a first resource or a first content item provided within the first resource; and
      primary referrer data associated with at least one of a second resource or a second content item provided within the second resource, the computing device having navigated from the first resource to the second resource after selection of the first content item in the first resource, the set of data packets received at the application server in response to selection of the second content item in the second resource on the computing device;
   parsing the set of data packets to identify one or more parameters;
   determining a third content item to be displayed in an application on the computing device based on the one or more parameters;
   generating a deeplink based on the third content item to be displayed in the application the deeplink including the primary referrer data and the secondary referrer data; and
   transmitting the deeplink to the application on the computing device.

18. The method of claim 17, further comprising:
   determining whether an application to be opened on the computing device is installed on the computing device;
   wherein the application server, in response to a determination that the application is not installed on the user device, is configured to either provide the application for download by the computing device or to cause an application store to provide the application for download by the computing device.

19. The method of claim 17, wherein the deeplink comprises one of a uniform resource locator (URL) and a uniform resource identifier (URI) partially comprising a referrer field including parameters relating to the primary referrer data and the secondary referrer data;
   wherein the parameters are one of common gateway interface (CGI) parameters and parameters generated from a key-value pair map.

20. The method of claim 18, wherein the deeplink comprises a referrer tag comprising parameters representative of the primary referrer data and the secondary referrer data.

\* \* \* \* \*